US005343534A

United States Patent [19]

Dorrough et al.

[11] Patent Number: 5,343,534

[45] Date of Patent: Aug. 30, 1994

[54] SEQUENTIAL AUDIO SWITCHER

[76] Inventors: Michael L. Dorrough, 5221 Collier Pl., Woodland Hills, Calif. 91364; Robert R. Conger, 1047 E. Angelo Ave., Burbank, both of Calif. 91501

[21] Appl. No.: 986,553

[22] Filed: Dec. 7, 1992

[51] Int. Cl.[5] .............................................. H02B 1/00

[52] U.S. Cl. ....................................... 381/123; 381/28; 381/81; 381/16; 381/120; 381/83

[58] Field of Search .................. 381/28, 81, 6, 16, 19, 381/120, 83, 93

[56] References Cited

U.S. PATENT DOCUMENTS

| | | | |
|---|---|---|---|
| 3,255,315 | 6/1966 | Mayer et al. | 381/16 |
| 3,710,034 | 1/1973 | Murry | 381/19 |
| 4,004,095 | 1/1977 | Cardone | 381/28 |
| 4,190,737 | 2/1980 | Dorren | 381/6 |

FOREIGN PATENT DOCUMENTS

| | | | |
|---|---|---|---|
| 43-27046 | 11/1968 | Japan | 381/93 |

OTHER PUBLICATIONS

PWM Applications, Elektor, Jan., 1980, pp. 1-36 to 1-38.

Digital Audio Mixer, Elektor, Jul./Aug. 1978, p. 7-58.

*Primary Examiner*—Forester W. Isen
*Attorney, Agent, or Firm*—J. E. McTaggart

[57] ABSTRACT

A two channel audio switcher includes two analog switches, which may be implemented as a CMOS integrated circuit, receiving at their control input ports a complementary pair of drive signals, typically square wave, so as to toggle their outputs at a supersonic rate, which may be made variable. The switcher may receive as input two channels of a stereophonic source, two independent audio sources or a common monophonic source. The outputs typically drive an audio output unit such as the transmitter of a radio broadcasting system, an audio recording system, or amplifiers, controls and loudspeakers of a sound reinforcement system in an auditorium or studio. The system may be monophonic or stereophonic. In a stereophonic a.m. broadcasting system such as the Kahn independent sideband system, alternate switching allows each sideband to be modulated to full available power, thus allowing an increase in the apparent radiated power. In audio recording, the switcher prevents peak levels of each channel from summing instantaneously and thus enables an increase in the effective recorded level on each channel. In a sound system where the source includes one or more microphones, an auxiliary microphone is made to provide intentional feedback to one channel of the switcher, providing flexibility in processing the toggled feedback to break up standing waves to suppress system feedback "howl", thus increasing the usable acoustic power and improving auditorium coverage.

16 Claims, 2 Drawing Sheets

SEQUENTIAL AUDIO SWITCHER

FIELD OF THE INVENTION

The present invention relates to the audio field and more particularly in the fields of broadcasting, recording and public address it relates to improvements in the processing of audio signals involving sequential switching between multiple channels at supersonic rates.

BACKGROUND OF THE INVENTION

In practically all forms of audio utilization such as radio broadcasting, recording and sound reinforcement, there is a peak level constraint. For example, in AM broadcast there is an inherent 100% modulation limit, in FM broadcast there is a legal deviation limit, in lathe mastering of disc records there is a physical limit due to groove spacing and potential groove-to-groove crosstalk, etc. In sound reinforcement involving a microphone there is an ultimate limit in available acoustic power and thus audience coverage due to the amplifier and speaker system, however the maximum usable acoustic power is often limited by positive acoustic feedback from the loudspeaker(s) to the microphone tending to cause "howl" at a critical power level greatly below the ultimate limit. Acoustic feedback is complicated by room acoustics and frequency-dependent standing-wave patterns.

In these various forms of audio utilization, including in particular stereophonic systems, it is generally desired to maximize the apparent loudness level, as perceived by a listener, as much as possible within the abovementioned limitations.

PRIOR ART

U.S. Pat. No. 3,665,106 to Parshad discloses a simultaneous two-way intercom system with a microphone and loudspeaker at each end in which, as an approach to the strong tendency for positive acoustic feedback, the two amplifiers are alternately switched on and off in succession at an audible rate, around either 150 Hz or 2,500 Hz. The very narrow resultant working bandwidth provided after even minimal filtering at these switching rates would be barely adequate for even low quality speech, and would fail to enable any high quality music reproduction. In evidence of shortcomings, compromises are suggested such as rounding off the switching waveforms and overlapping the switching as much as possible.

In an approach to suppressing positive acoustic feedback under quasi-quiescent conditions, U.S. Pat. No. 3,594,507 to Clark proposes an amplitude discrimination system which, in the absence of substantial audio signal levels, reduces the gain in alternate segments inhibited or attenuated at a supersonic chopping rate. This concept appears to depend on inherent system amplitude limiting type distortion as a form of brute-force gain reduction to suppress the positive feedback in the presence of substantial audio signal levels, since under these conditions the patented feedback-suppression mechanism is disabled and the system operates in a conventional manner.

Both the Parshad and the Clark patents evidence severe limitations due their vacuum tube implementation and thus failed to realize advantages which have become available through more recent developments. The performance and speed capabilities of solid state technology such as CMOS integrated circuits have now opened up new potential for creation of more advanced supersonic switching techniques and applying them to the advancement of technologies such as stereophonic systems and developmental pursuits such as independent sideband a.m. stereo broadcasting.

OBJECTS OF THE INVENTION

It is a primary object of the present invention to provide audio enhancement apparatus which can increase the perceived level capability within given system limitations.

It is an object to provide improvements in the radio broadcasting of audio signals, including stereophonic AM, to achieve an apparent increase in effective modulation within predetermined legal and inherent modulation limits.

It is an object to provide improvements in the recording of audio signals, such as in lathe-mastering of records, to achieve an apparent increase in effective recording level within predetermined limits of overload and distortion, It is another object to provide improvements in sound reinforcement systems to effectively suppress regenerative acoustic loudspeaker-to-microphone feedback so as to increase the usable power and effective audience coverage.

SUMMARY OF THE INVENTION

The above objects may be realized through the utilization of the present invention of electronic switching circuitry which can switch a plurality of audio channels in a manner to sequentially select and activate each one of the channels alone in turn, at a variable supersonic switching rate.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
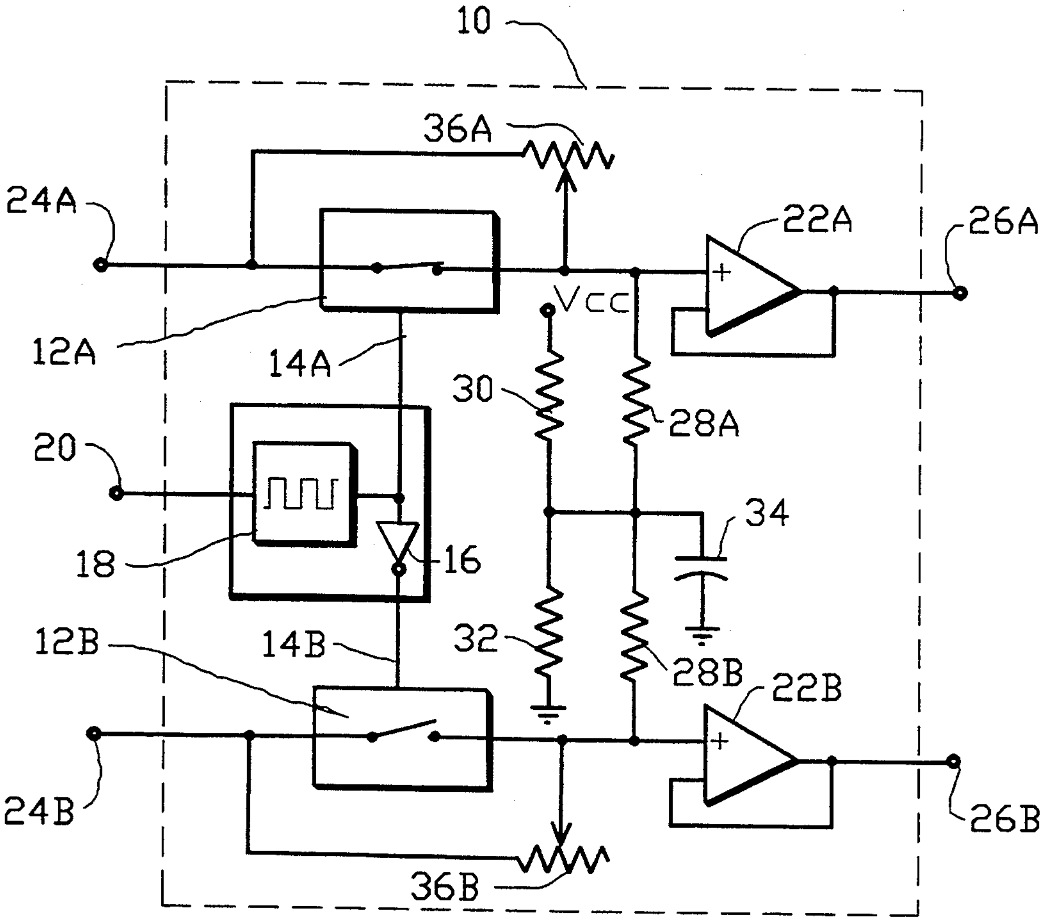
FIG. 1 is a functional block diagram/schematic of an audio switching unit of the present invention.

In the illustrative embodiment of FIG. 1, a two channel audio switcher 10 of the present invention is implemented by two analog switches 12A and 12B which may be implemented from a CMOS quad analog switch IC (integrated circuit), e.g. type CD4066CN. Control input port 14A of switch 12A receives a drive waveform, typically a square wave at a supersonic rate in a range from 15 kHz to 60 kHz or more, while control input port 14B receives an inverted version of the same waveform, which is generated from an oscillator 18, which may implemented from a CMOS IC, e.g. type CD4047DE, according to published application notes. The frequency of oscillator 18 is made variable via a control input 20 by connecting a timing element such as a capacitors or resistor, or a d.c. control voltage.

Two isolation amplifiers 22A and 22B are connected with full negative feedback to function as unity gain buffers having high input impedance and low output impedance: these may be implemented from a multiple operational amplifier IC, e.g. quad type LM741. Input signals supplied to terminals 24A and 24B are interrupted alternately by switches 12A and 12B respectively, and their toggled outputs are applied to the non-inverting inputs of buffers 22A and 22B, biased as shown by resistors 28A, 28B, 30, 32 and capacitor 34, providing toggled outputs at terminals 26A and 26B respectively. Potentiometers 36A and 36B, connected as variable resistors between the input and output of switches 12A and 12B respectively, allow a controllable portion of continuous audio from the input to be transmitted to the output terminals 26A and 26B along with the toggled portion so as to provide continuous throughput which is alternately full amplitude and attenuated, the attenuation being a function of the voltage division established by each potentiometer 36A or 36B and corresponding resistor 28A or 28B. To allow the audio signal feedthrough to be reduced to zero, potentiometers 36A and 36B may be made to include a series switch (not shown) which opens at the maximum resistance end of the range.

Figure 2:
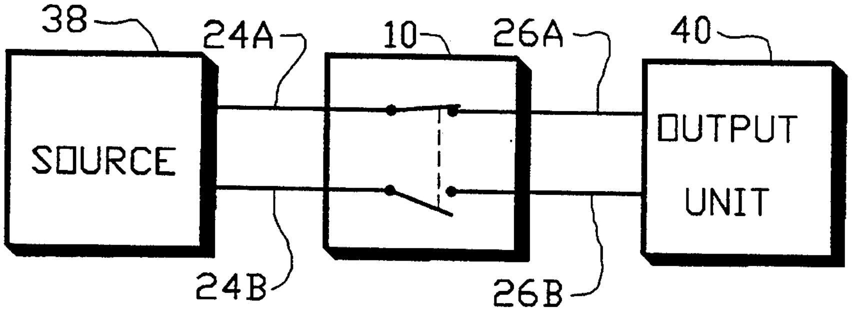
FIG. 2 is a functional block diagram of a general audio system utilizing the audio switching unit of FIG. 1.

Typical component values are: resistors 28A, 28B: 10 k ohms resistors 30, 32: 2 k ohms capacitor 34: 12 uF potentiometers 36A, 36B: 25 k ohms FIG. 2 illustrates the general manner of utilizing an audio switcher 10 of the present invention in conjunction with an audio system which may be any of several existing audio systems such as (a) a radio broadcasting system, (b) an audio recording system, or (c) a sound reinforcement system in an auditorium or studio.

An audio source 38, which may be two channels of a stereophonic source, two independent audio sources or a common monophonic source, provides input at terminals 24A and 24B of switcher 10 whose outputs at terminals 26A and 26B are connected to an output unit 40 such as a radio transmitter, recording device or loudspeaker, including associated amplification and other processing such as fading, cross-fading and equalization.

In each instance the system may be monophonic or stereophonic, and typically both source 38 and output unit 40 will include some form of transducer.

In case (a) where FIG. 2 represents a stereophonic a.m. broadcasting system in which switcher 10 has been incorporated, source 38 is stereophonic audio, and output unit 40 includes an a.m transmitter such as the Kahn system in which stereophonic information is impressed by modulating two sidebands in an independent manner. With switcher 10 adjusted to operate in a full switching mode, the rapid toggling between the left and right audio channel input to the transmitter modulator momentarily suppresses one of the sidebands so that the power normally allocated to the suppressed sideband becomes available to the remaining sideband, thus the remaining sideband can be modulated to the full value of the total available carrier power, in effect appreciably increasing the apparent radiated power over that of stereophonic broadcasting as normally practiced without toggle-switching.

In case (b) where FIG. 2 represents an audio recording system, source 38 is typically stereophonic and may include two channel preamplification while the balance of the system in output unit 40 typically includes a mixing console, and in the case of disc recording, the recording head of a master disc cutting lathe. The incorporation of switcher 10 into such a system, rapidly toggling between the two input channels at a supersonic rate which does not degrade the audio quality of the recording, but by preventing peak levels of each channel to sum instantaneously, enables an increase in the effective recorded level on each channel, compared to that of the conventional (non-toggled) stereophonic recording system, without exceeding the dynamic range limits of the stereo recording media mechanism, for example the allowable groove excursions in a disc recording.

Figure 3:
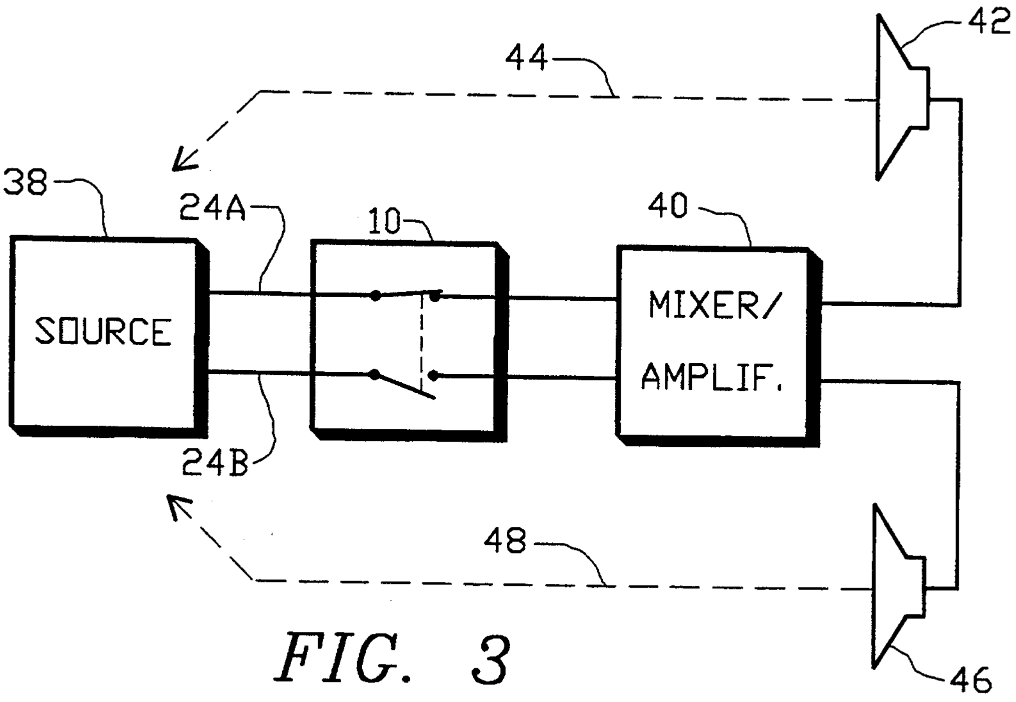
FIG. 3 is a functional block diagram of an audio sound reproduction system utilizing the audio switching unit of FIG. 1 for suppression of incidental acoustic feedback.

FIG. 3 illustrates case (c) where output unit 40 represents the main portion of a sound system including, in addition to typically a mixing console, audio power amplifiers driving, from a first channel, a first loudspeaker 42 (or a bank of loudspeakers) with an acoustic radiation path 44 and, from a second channel, a second loudspeaker 46 (or a bank of loudspeakers) with an acoustic path 48. When the audio source 38, connected to switcher input terminals 24A and 24B, is in any manner microphonic, e.g. a transducer such as disc record player which tends to exhibit incidental microphonic sensitivity at the pickup, unwanted stimulation of source 38 from acoustic energy feedback via paths 44 and/or 48 may degrade the overall audio quality or even produce an oscillatory "howl" in the system due to positive acoustic feedback reaching a critical regenerative level. The incorporation of switcher 10 into such a system, by toggling between loudspeakers 42 and 46 at an inaudible high rate, acts in a manner to break up standing wave patterns in the acoustic environment, thus increasing the critical threshold of acoustic feedback oscillation, reducing the tendency to "howl". This allows the sound system gain to be increased, thus improving the auditorium coverage over that normally available in a conventional (non-toggled) sound system.

Figure 4:
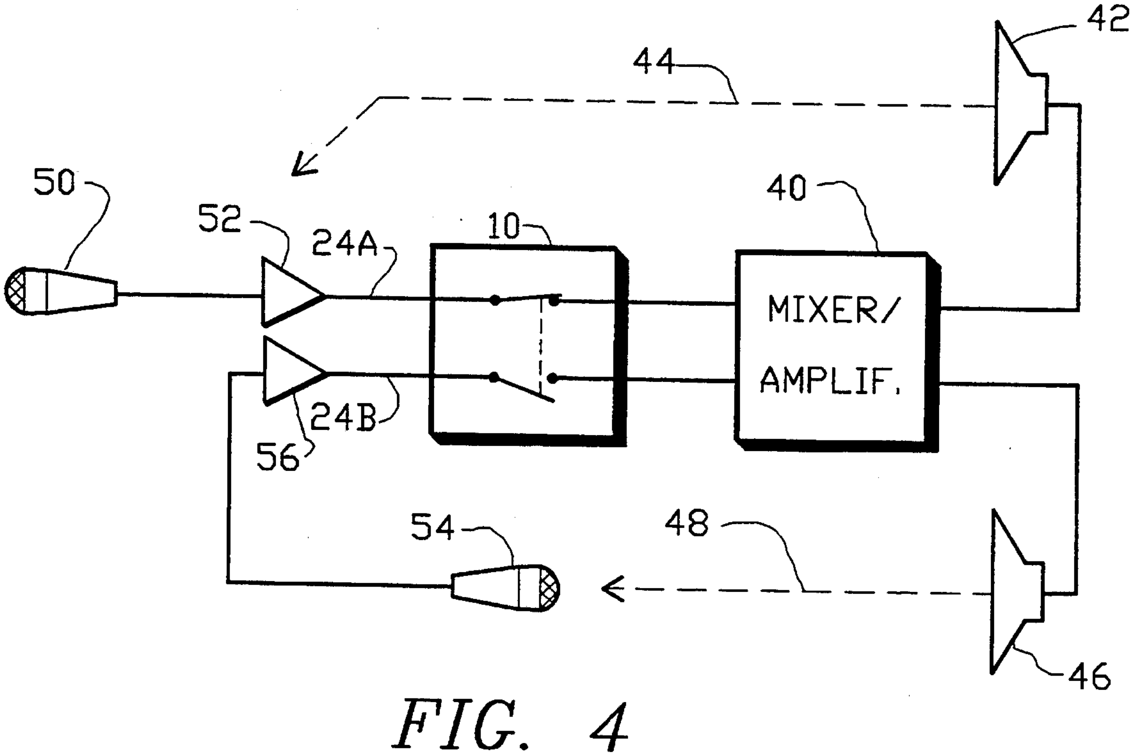
FIG. 4 is a functional block diagram of an audio sound reinforcement system utilizing the audio switching unit of FIG. 1 for suppression of acoustic feedback.

FIG. 4 illustrates a version of case (c) in which output unit 40 drives loudspeakers 42 and 46 similar to the previous example (FIG. 3), but where a main microphone 50 and preamplifier 52 provide a first input at switcher terminal 24A and an auxiliary microphone 54 and preamplifier 56 provide a second input at switcher terminal 24B. The main microphone 50 is intended for typical use such as by a performer or lecturer, and is generally made directional and directed at the user, while auxiliary microphone 54 is intended to be optimally located, oriented and processed in a manner to suppress tendencies of the system to "howl" due to positive acoustic feedback. Microphone 54 may be located at some distance from the user and may be of a different type, directivity pattern and orientation than the main microphone 50. Generally microphone 50 will be located as much as possible away from the influence of both acoustic paths 44 and 48, while microphone 54 will be strategically located in one or both acoustic paths 44 and 48. Portion 40 of the existing sound system normally includes capabilities of individual channel gain control and equalization, and preferably includes adjustable cross-coupling, individual channel phase reversal and interchannel reversal capabilities. Manipulation of these capabilities provides flexibility for optimally processing both the main signal from microphone 50 and the feedback-suppression signal from microphone 54, as these two are toggled by switcher 10 at an inaudible-frequency rate. With the freedom to locate microphone 54 to best advantage, audio toggling in accordance with this aspect of the present invention provides an unprecedented degree of flexibility and effectiveness in the suppression of any tendency of the overall sound system to "howl" due to positive acoustic feedback in various field environments.

Thus the toggled feedback control system of FIG. 4 will allow a sound reinforcement system to be operated at higher gain and effectively cover a larger audience area compared to a conventional (non-toggled) sound reinforcement system.

As an extension of the principles described above, they may readily applied to audio systems having more than two channels, e.g. quadraphonic, where the switcher can be designed to sequentially enable, disable or interchange one or more channels at a time.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A sequential audio switcher comprising:

a first solid state audio switching device, interposed in a first audio channel receiving a first audio signal;

a second solid State audio switching device, interposed in a second audio channel receiving a second audio signal;

timing means operating at a supersonic rate and connected to control inputs of said first and second audio switching devices so as to repetitiously enable and inhibit signal transmission through each channel in an alternating sequential manner such that whenever transmission in one of the channels is enabled transmission in the other Channel is inhibited.

first and second buffers receiving input from said first and second switch devices respectively and providing, as output, first and second switched signals respectively, said buffers being made to have relatively high input impedance and low output impedance;

a first variable resistor connected between an input node of said first switch device and an output node thereof;

a first fixed resistor connected between the output node of the first switch device and a signal ground node;

a second variable resistor connected between an input node of said second switch device and an output node thereof; and a second fixed resistor connected between the output node of the second switch device and the signal ground node;

whereby a controlled proportion of the first audio signal, as determined by resistance values of said first variable and fixed resistors, is transmitted to the first output node between time periods when the first channel is fully enabled and whereby a controlled proportion of the second audio signal, as determined by resistance values of said second variable and fixed resistors, is transmitted to the second output node between time periods when the second channel is fully enabled.

2. The audio switcher as defined in claim 1 wherein said timing means comprises a solid state oscillator circuit delivering a substantially square wave signal as binary control input to one of said switching devices and delivering an inverted replica of the square wave signal as binary control input to the other one of said switching devices.

3. The audio switcher as defined in claim 2 wherein said oscillator is provided with a variable control element whereby the supersonic rate may be varied within a predetermined range.

4. The audio switcher as defined in claim 1 wherein the first and second audio signals are stereophonic and the dual-channel audio output unit is a stereophonic record cutting lathe and recording head.

5. The audio switcher as defined in claim 1 wherein:

the first and second audio signals are received from an external audio source;

each of said buffers is connected to a corresponding one of two inputs of a dual-channel audio output unit; and the first and second audio signals are stereophonic and the dual-channel audio output unit is a stereophonic amplitude-modulated broadcast transmitter and associated audio control circuitry.

6. The audio switcher as defined in claim 1 wherein the first and second audio signals are stereophonic and the dual-channel audio output unit is a stereophonic frequency-modulated broadcast transmitter and associated audio control circuitry.

7. The audio switcher as defined in claim 1 wherein the output unit comprises a stereophonic audio power amplifier driving two loudspeaker units, one at each of two output ports.

8. The audio switcher as defined in claim 7 wherein the first and second audio signals are stereophonic.

9. The audio switcher as defined in claim 8 wherein the audio source device comprises a stereophonic disc record player, and wherein operation of said switcher is utilized to mitigate acoustic feedback reaching a pickup head of the record player.

10. The audio switcher as defined in claim 7 wherein the first audio source comprises a first microphone and associated preamplifier connected as input to the first channel, and the second audio source comprises a second microphone and associated preamplifier connected as input to the second channel, the first microphone being located and oriented for minimal acoustic feedback from the loudspeaker units and is designated and utilized as a program pickup unit, while the second microphone is located and oriented particularly to act as a pickup unit for processing acoustic feedback from said loudspeaker units in a manner to modify and control overall effects of positive acoustic feedback.

11. An alternating audio switcher comprising:

a plurality of audio channels, each channel having an input and an output;

switch means connected between each said input and said output;

toggle means connected to said switch means for alternately interrupting the audio signal through all except one of said channels such that only one of said channels is enabled for conducting and audio signal at any one time, said toggle means operating at a sufficiently high rate such that the audio output of all said channels appears uninterrupted to the human ear; and signal divider means connected between said input and said output of each said channel bypassing said switch means for enabling the audio output of each channel to include a continuous portion of the audio signal input and a toggled audio portion of the same audio signal input.

12. The system of claim 11 wherein said divider means are adjustable so as to enable the continuous audio portion of the channel output to be adjusted relative to the toggled audio portion.

13. The system of claim 12 wherein said signal divider means are potentiometers.

14. The system of claim 11 further comprising:

isolation amplifier means connected between said switch means and said channel output in each of said channels; and potentiometers connected between the input and the output of said switch means for diverting a portion of the audio signal input to each said isolation amplifier means for enabling the audio input signal to each channel to be fed in part to said switch means to derive a toggled audio output and fed in remaining part to said isolation amplifier means for deriving a continuous audio output combined with said toggled output of each said channel.

15. A method for increasing the effective modulation level of an independent sideband stereophonic amplitude modulated broadcast transmitter having a pair of stereophonic audio input paths, comprising the steps of:

introducing in the two paths two corresponding channels of an audio switcher with toggle means alternately enabling and inhibiting each of the two channels at a supersonic toggle rate; and making gain adjustments in each path so as to allow each of the independent sidebands to approach full modulation in turn while the other sideband is temporarily inhibited.

16. A method for reducing positive acoustic feedback and thus suppressing "howl" in a sound reinforcement system having an audio signal path which includes a performer's microphone cooperating with an amplifier and at least a portion of a multi-unit loudspeaker system, comprising the steps of:

introducing, in the audio signal path, a first channel of an audio switcher with toggle means alternately enabling and inhibiting the first channel and a second channel at a supersonic toggle rate;

deploying an auxiliary microphone at a selected location to receive an acoustic signal from the loudspeaker system;

applying an audio signal originating from the auxiliary microphone as input to the second channel of the switcher;

applying an audio output signal originating from the second channel, via an auxiliary amplifier including equalizing and controlling means, to a selected portion of the multi-unit loudspeaker system; and adjusting the equalizing and controlling means to minimize overall positive feedback and maximize audio power output capability of the sound reinforcement system.

* * * * *